Nov. 7, 1967    R. J. FOWLER    3,351,141
POSTHOLE AUGER STABILIZER
Filed April 20, 1965    2 Sheets-Sheet 1

Roy J. Fowler
INVENTOR.

BY *Clarence A. O'Brien*
and *Harvey B. Jacobson*
Attorneys

Nov. 7, 1967   R. J. FOWLER   3,351,141
POSTHOLE AUGER STABILIZER
Filed April 20, 1965   2 Sheets-Sheet 2

Roy J. Fowler
INVENTOR.

BY
Clarence A. O'Brien
and Harvey B. Jackson
Attorneys

United States Patent Office

3,351,141
Patented Nov. 7, 1967

3,351,141
POSTHOLE AUGER STABILIZER
Roy J. Fowler, Rte. 2, Elk City, Okla. 73644
Filed Apr. 20, 1965, Ser. No. 449,579
6 Claims. (Cl. 173—38)

ABSTRACT OF THE DISCLOSURE

A posthole auger stabilizer and fence guard attachment for a tractor mounted earth boring device which attachment horizontally displaces the wires of an existing fence while guiding the earth boring device to permit the boring of a fence posthole between two existing fence posts in alignment with the existing fence posts.

---

The present invention relates to posthole auger attachments for farm tractors, and the like, and more specifically to a stabilizing and fence wire deflecting attachment for tractor mounted, power take-off operated posthole augers.

Various posthole attachments have been proposed for use with farm tractors, and the like. The attachments are generally characterized by a plurality of support arms which are pivotally, and/or rigidly secured to the several hitch points on the rear of the tractor. The support arms, by means of a universal type joint, support a power-take-off operated, downwardly projecting, helical auger which hangs pendulously therefrom. A posthole auger attachment of the type described is reasonably although not entirely satisfactory when a plurality of postholes are being drilled to establish a new fence row for example. However, when it is necessary to add, or replace posts in an existing fence row the posthole auger attachments known heretofore are generally totally unsatisfactory, because they are not designed to deflect the existing fence wires to permit boring a posthole which is substantially in alignment with the existing fence posts in the fence row.

It is therefore an object of this invention to provide a fence wire deflector and auger stabilizing attachment for a fence posthole auger of the type which is generally utilized in connection with a conventional hydraulically operated three-point hitch commonly utilized in hitching implements to farm tractors.

Another object of this invention is to provide a posthole auger stabilizer attachment for a tractor mounted power-take-off operated earth auger which cooperates to hold the auger at a substantially perpendicular angle with respect to the surface of the ground during the boring of a fence posthole.

A further object of this invention is to provide a fence wire deflecting means for a posthole auger stabilizer which cooperates to deflect the fence wires sufficiently to permit the boring of a fence posthole in alignment with the existing fence posts in the fence row.

Still another object of this invention is to provide a fence wire deflecting and auger stabilizer attachment for tractor mounted posthole augers which is simple in design, economical to manufacture, durable in use, and effective for the purposes for which it is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
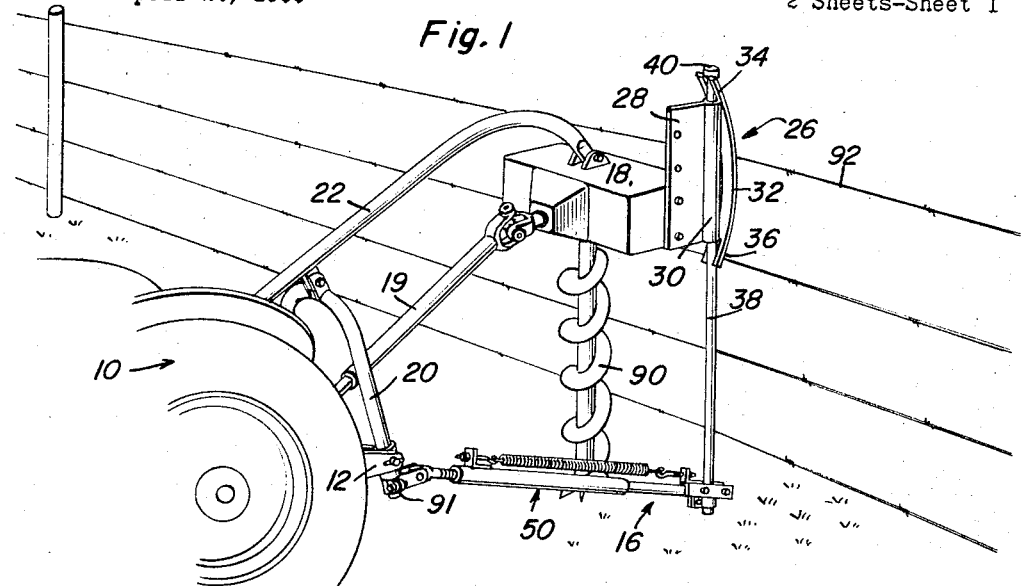
FIGURE 1 is a perspective view of the posthole auger stabilizer of the present invention shown secured to a conventional posthole auger which is supported and powered by a conventional farm tractor having a hydraulically operated three-point hitch.

Referring now to the drawings, a conventional farm tractor equipped with a hydraulically operated three-point hitch is indicated generally at 10. One point of the three-point hitch may be seen at 12.

The fence hole auger stabilizer and fence wire deflector embodying the present invention is indicated generally at 16 and is shown operatively secured to a conventional tractor mounted, power-take-off operated earth auger 90 which is operatively supported from the three-point hitch of the tractor 10 by means of support arms 20 and 22. The gear box 18 of the auger 90 is connected by means of telescopically splined drive shaft 19 which is connected to the power-take-off unit of the tractor 10.

Figure 6:
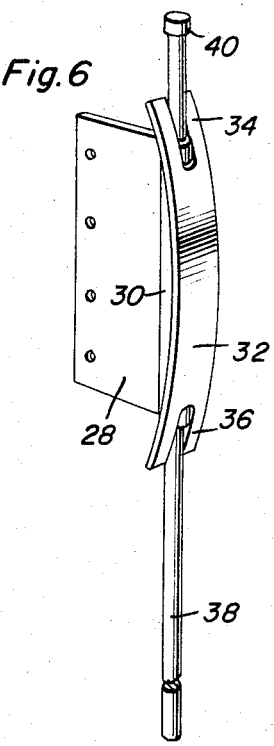
FIGURE 6 is a perspective view of the fence wire deflecting and auger guiding portion of the present device.

The posthole auger stabilizer and end post wire deflector 16 utilized to improve the utility of the earth auger 90 includes a vertically disposed auger guide means 26 which is rigidly secured to the gear box 18 of the auger 90 by suitable means such as holding, riveting, welding or the like. The auger guide and fence wire deflecting means 26 includes a substantially flat metallic plate 28 which is secured in a generally vertical position with regard to the gear case 18 of the earth auger 90. An elongated tubular bearing 30 is secured to the metal plate 28 by means of welding, or the like, substantially in alignment therewith, in generally opposed relationship to the tractor 10 i.e. it faces outwardly from the earth auger 90. An arcuate fence wire deflecting member 32 is secured to the elongated tubular bearing 30 adjacent its upper and lower ends by means of welding, for example. The upper and lower ends of the arcuate fence wire deflecting member 32 terminate in bifurcated portions 34 and 36 as seen best in FIGURES 2 and 6, in the arcuate configuration of the fence wire deflecting member 32 causes the bifurcated ends 34 and 36 to partially encircle a substantially vertically disposed guide bar 38 which is slidably received within the elongated tubular bearing 30. The upper end of the guide bar 38 is provided with a bulbous portion 40 which is secured thereto by welding, or the like to prevent the bearing 30 from sliding off the top of the guide bar 38 when the earth auger 90 is lifted free of the ground.

The lower end of the guide bar 38 is provided with a removably secured stop member 42 which is a split clamp type secured to the guide bar 38 by means of a bolt 44 which frictionally locks the stop 42 to the guide bar 38.

A stabilizer bar, or tube, means indicated generally at 50 is provided to stabilize the guide bar 38 to prevent undue oscillation of the guide bar 38 with respect to the support arm 20 of the post auger 90.

The stabilizer means 50 includes a bar 52. A pair of metal plates 54 and 56 are secured to either side of the bar 52 by means of welding, or the like to provide a means of supporting the shafts 58 and 60 which provide the support bar a pair of anti-friction rollers 62 and 64 between which the vertically disposed guide bar 38 is slidably received.

Figure 4:
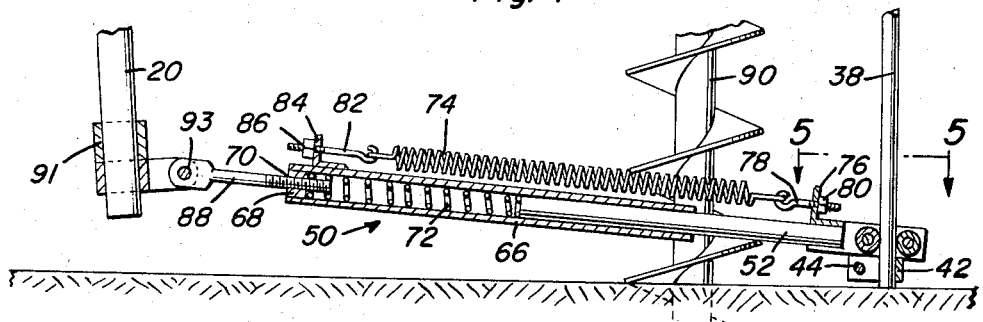
FIGURE 4 is a slightly enlarged side elevational view of a portion of the device with portions of the stabilizing bar broken away to show interior details.
Figure 5:
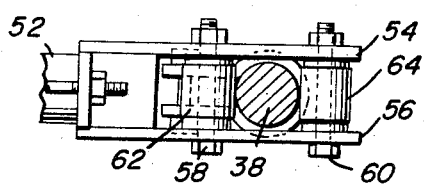
FIGURE 5 is a top plan view of a portion of the stabilizing bar means, further showing in detail an anti-friction roller guide means carried thereby.

A tubular member 66 is telescopically received by the bar 52 as seen best in FIGURE 4. The tube 66 is further provided with an end plug 68 which is provided with a threaded aperture 70 therethrough in axial alignment with the bore of the tube 66. In their assembled relationship the bar 52 and the telescopically received tube 66 are assembled with a helical spring 72 therein to act as a means of limiting the telescopic movement of the tube 66 with regard to the bar 52 to aid in controlling the effective length of the stabilizer means 50. As also seen best in FIGURE 4, the stabilizer means 50 is further provided with a second helical spring 74 which is adjustably secured externally of the telescopic tube 66 by means of an angle bracket 76 secured to the bar 52 intermediate of the upper sides of the plates 54 and 56 by means of welding, or the like. The angle bracket 76 is provided with an aperture therethrough substantially in parallel alignment with the bar 52 for the reception of a hook 78 which is prevented from pulling out of the angle bracket 56 by its respective threadably received nut 80. The external helical spring 74 is provided with a pair of loops or hooks adjacent its ends, one of which is hooked in the member 78. The other end of the spring 74 is hooked in a hook member 82 which is adjustably secured in an angle bracket 84 which is in turn rigidly secured to the telescopic tube 66 by welding, or the like, in a manner similar to the mounting of the angle bracket 76. The hook member 82 is also provided with a threadably received nut 86. It will therefore be seen that the spring 72 resists the compressive forces attempting to compress the telescopic tube 66 with regard to the bar 52 and the spring 74 acts to regulate the expansion of the telescopic tube 66 with regard to the bar 52, thereby providing a shock absorber. The bias on the spring 74 may be adjusted by means of the nuts 80 and 86.

The stabilizer means 50 further includes a threaded rod 88 which is threadedly received within the threaded aperture 70 of the plug 68 of the telescopic tube 66 and is pivotally secured to a bifurcated clamp type bracket 91 which is clamped to a lower portion of the support arm 20. The member 88 pivots about a horizontal axis provided by the pin bolt 93 which is carried in suitable apertures in the bifurcated portion of the member 91.

Figure 7:
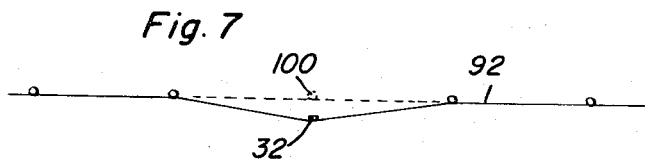
FIGURE 7 is a schematic view of an existing fence row showing how the fence wire is deflected out of straight-line relationship with regard to the existing fence post to permit the boring of a fence posthole which is in substantial alignment with the existing fence posts.
Figure 3:
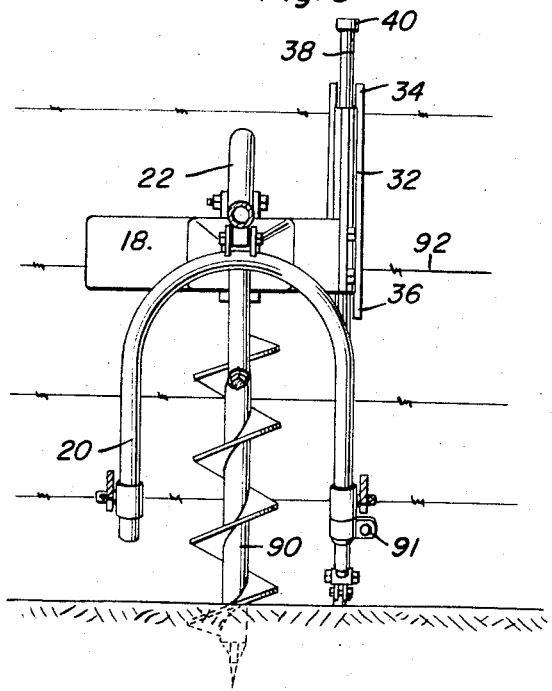
FIGURE 3 is a front elevational view of the present device taken substantially along the plane of the line 3—3 of FIGURE 2.

In operation the posthole auger stabilizer and fence wire deflecting attachment would be utilized as follows:

As seen in FIGURE 1 the tractor supporting the earth auger gear case 18 with the device of the present invention secured thereto would be backed up adjacent to a point at which the operator desires to bore a fence posthole. With the arcuate member 32 of the fence wire deflecting means 26 in contact with the fence wire 92 the operator would back up carefully to deflect the wire in an arcuate configuration as seen in FIGURE 7 in full line, to permit boring of the fence posthole 100 substantially in alignment with the existing posts in the fence row.

Figure 2:
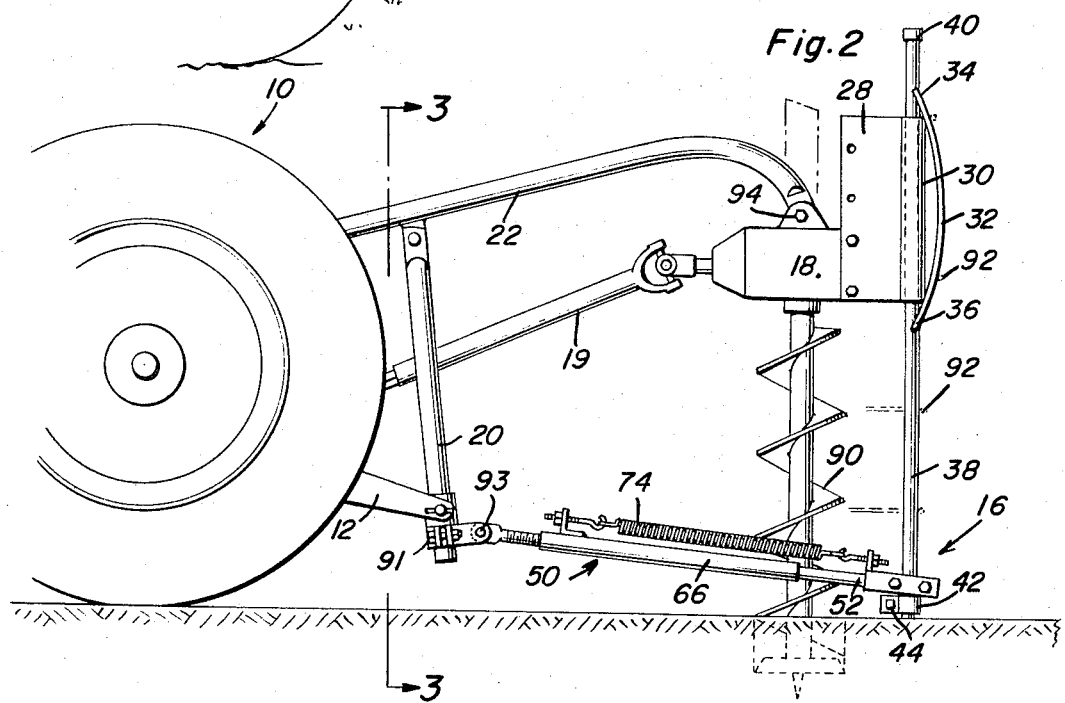
FIGURE 2 is a slightly enlarged side elevational view of the present device, further showing the means of deflecting the fence wires during the boring of a posthole.

By actuation of the hydraulic, and power-take-off controls the earth auger would be lowered into contact with the ground and power transmitted to the auger to start boring the hole as seen best in FIGURE 2. The vertical orientation of the auger 90 is determined by the guide bar 38 by virtue of the fact that the bearing 30 which is slidably received about the guide bar 38 is rigidly secured to the gear box 18 of the auger device. As seen best in FIGURE 2, as the auger 90 cuts its way into the earth the arcuate member 32 will cam the lower fence wires 92 out of the way so as to prevent damage thereto.

The stabilizing means 50 by virtue of its construction will tend to resist the forces tending to displace the lower portion of the guide bar 38 about a point defined by the pivot means 94 at the top of the earth auger gear case 18, therefore stabilizing the guide bar 38 and relieving undue lateral stress on the auger 90.

Accordingly, therefore it may be seen that there has been provided a posthole auger stabilizer and fence wire deflecting attachment for tractor mounted earth augers which is highly effective for the purpose and utility intended.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. In combination a posthole auger stabilizer and fence guard attachment for a tractor mounted power-take-off operated earth boring device provided with a tractor carried support means, said attachment comprising a means carried by the earth boring device to displace the wires of a fence while guiding the earth boring device to permit the boring of a substantially vertical fence posthole in generally straight line alignment with the existing fence posts in the fence row, and a resilient stabilizing means operatively associated with and extending between said fence wire displacing-auger guiding means and the tractor carried support means for the earth boring device to stabilize the path of travel of the auger during the boring of a fence posthole in an existing fence row.

2. In combination a posthole auger stabilizing and fence guard attachment for a tractor mounted power take-off operated earth boring device provided with a tractor carried support means, said attachment comprising a means operatively associated with the earth boring device to displace the wires of a fence to permit the boring of a fence posthole in generally straightline alignment with the existing fence posts in the fence row, said fence wire displacing means including a bearing means secured to said earth boring attachment and adapted to slidably receive a vertically disposed auger guide means, and resilient means operatively secured to and extending between said fence wire displacing-auger guiding means and the tractor carried support means for the earth boring device to stabilize the path of travel of the auger during the boring of a fence posthole.

3. The structure of claim 2 wherein said fence wire displacing means includes a vertically disposed member adapted to be secured to the posthole boring device, said member extending outwardly thereof, an elongated tubular bearing secured to said vertically disposed member in a substantially vertical position, an arcuate member secured to and outwardly of said tubular bearing, said arcuate configuration of said member being adapted to cam the fence wires out of the path of the auger guide means as said tubular bearing moves downwardly along said vertically disposed auger guide means during the boring of a fence posthole.

4. The structure of claim 2 wherein said resilient stabilizing means includes a telescopically slidable, adjustably spring-biased auger stabilizing tube, one end of said tube being pivotally secured to the tractor carried support means of the earth boring device the other end of said tube being slidably journaled to said auger guided means.

5. The structure of claim 4 wherein said telescopically slidable adjustably spring-biased auger stabilizing tube is normally tensioned by a tension spring having a first and a second end, said first end being carried by one portion and said second end being operatively carried by the other portion of said telescope tube.

6. In combination a posthole auger stabilizer and fence guard attachment for a tractor mounted power take-off operated earth boring device carried by a tractor mounted hydraulically operated three-point hitch, said attachment comprising a means carried by the earth boring device to displace the wires of a fence while guiding the earth boring device to permit the boring of a substantially vertical fence posthole in generally straight line alignment with the existing fence posts in the fence row, said means of displacing the wires comprising an arcuate member operatively carried by said boring device, and a resilient stabilizing means operatively associated with and extending between said fence wire displacing-auger guiding means and the tractor carried three-point hitch secured support means for the earth boring device so as to stabilize the path of travel of the auger during the boring of a fence posthole in an existing fence row.

References Cited

UNITED STATES PATENTS

| | | | |
|---|---|---|---|
| 1,509,821 | 9/1924 | Anderson | 173—31 |
| 2,474,981 | 7/1949 | McCardell | 173—46 |
| 2,493,261 | 1/1950 | Porter et al. | 173—39 |
| 2,521,895 | 9/1950 | Bunting | 173—38 |

FRED C. MATTERN, Jr., *Primary Examiner.*

L. P. KESSLER, *Assistant Examiner.*